No. 739,442. PATENTED SEPT. 22, 1903.
J. F. PENROD.
REIN SUPPORT.
APPLICATION FILED JULY 25, 1903.
NO MODEL.

Witnesses
M. E. Corder
M. A. Schmidt

Inventor
John F. Penrod
By Milo B. Stevens & Co.
Attorneys

No. 739,442. Patented September 22, 1903.

UNITED STATES PATENT OFFICE.

JOHN F. PENROD, OF BRANCH, PENNSYLVANIA.

REIN-SUPPORT.

SPECIFICATION forming part of Letters Patent No. 739,442, dated September 22, 1903.

Application filed July 25, 1903. Serial No. 166,986. (No model.)

*To all whom it may concern:*

Be it known that I, JOHN F. PENROD, a citizen of the United States, residing at Branch, in the county of Westmoreland and State of Pennsylvania, have invented certain new and useful Improvements in Rein-Supports; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a support for driving reins or lines, and has for its object a device to prevent them from catching on the harness, shafts, or under the animal's tail.

A further object is to support the reins so that their weight will be off the driver's arms.

A further object is to provide a device by which the animal may be steered or controlled by the foot of the driver without the use of his arms.

The invention is illustrated in the accompanying drawings, in which—

Figure 1:
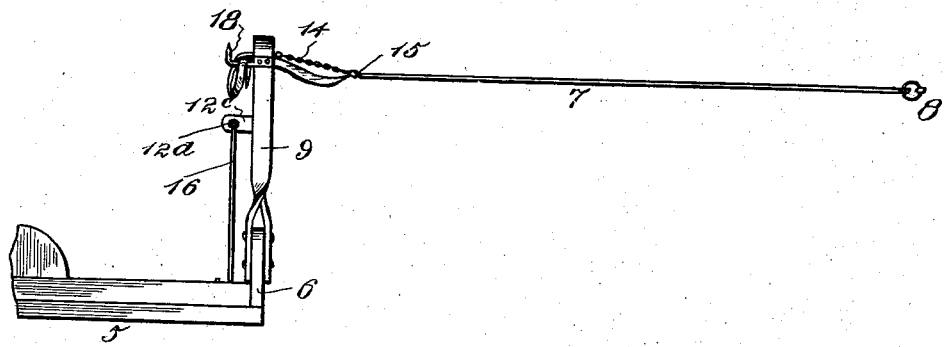
Figure 2:
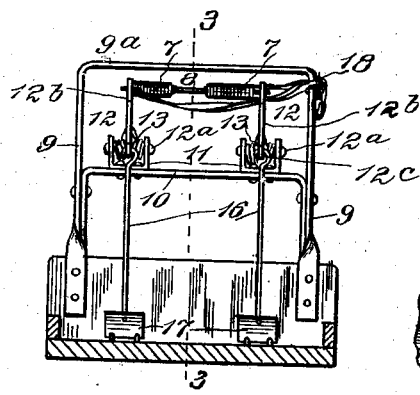
Figure 3:
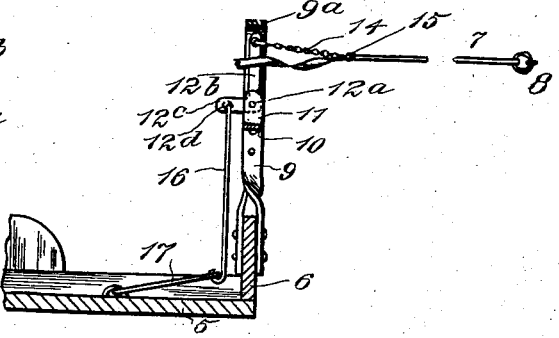

Figure 1 is a side elevation of a portion of a vehicle, showing the application of the device. Fig. 2 is a front elevation thereof. Fig. 3 is a section on the line 3 3 of Fig. 2.

Referring specifically to the drawings, 5 indicates the floor of a vehicle, and 6 the dashboard thereof. The driving reins or lines are indicated at 7 and have at their outer ends a bit 8. At 9 are indicated standards secured to the dashboard, said standards being joined at the top by a cross-bar 9ª. A horizontally-disposed cross-bar 10 extends between the standards between the cross-bar 9ª and the top of the dashboard. On the cross-bar 10 are secured bearing-brackets 11, in which the bell-crank levers 12 are fulcrumed by a pin 12ª. A spring 13 is coiled around the pin, the end of said spring pressing against the vertical arm 12ᵇ of the lever, for a purpose to be hereinafter described. Two levers are used, and at the upper end of the vertical arm of each a short chain 14 is secured, having at its outer end a buckle or pin 15, by which it is attached to the reins 7. The outer end of the horizontal arm 12ᶜ of each lever has an eye 12ᵈ, through which a rod 16 is hooked, which extends downwardly and is secured to a treadle 17 on the floor of the vehicle.

The springs 13 referred to above press against the levers, which draw in the reins, keeping them taut, and thus preventing them from becoming tangled and catching on the harness and shaft or under the animal's tail. The end 7ª of the reins may be hung over a hook 18 on one of the standards and the animal controlled or steered by pressing on the treadle with the foot. Either treadle pressed on will, by means of the levers and connections above described, cause the bit on the same side to pull, and thus steer the animal. When the foot is removed from the treadle, the springs 13 will return the levers to their normal position and with it the reins.

I have shown and described my invention as secured to the dashboard of the vehicle; but it is obvious that it may be located at any other suitable place on the vehicle.

Having thus described my invention, what I claim as new, and desire to secure by Letters Patent, is—

1. The combination with a vehicle and driving-reins, of treadles on vehicle, and an elastic connection between the treadles and reins, substantially as described.

2. The combination with a vehicle and driving-reins, of spring and treadle actuated bell-crank levers on the vehicle, and connected to the reins, substantially as described.

3. The combination with a vehicle and driving-reins, of bell-crank levers on the vehicle and connected with the reins, and treadles for operating the levers, substantially as described.

4. The combination with a vehicle and driving-reins, of a support on the vehicle, bell-crank levers fulcrumed thereon and connected to the reins, and treadles for operating the levers, substantially as described.

5. The combination with a vehicle and driving-reins, of a spring-actuated bell-crank lever, fulcrumed on the vehicle and connected to the reins, substantially as described.

In testimony whereof I affix my signature in presence of two witnesses.

JOHN F. PENROD.

Witnesses:
J. TEE,
J. B. CATLIN.